US012651531B2

(12) United States Patent
Avedisov et al.

(10) Patent No.: US 12,651,531 B2
(45) Date of Patent: Jun. 9, 2026

(54) SYSTEMS AND METHODS FOR GROUPING VEHICLES BY ADAPTING MESSAGE COMMUNICATIONS

(71) Applicant: Toyota Motor Engineering & Manufacturing North America, Inc., Plano, TX (US)

(72) Inventors: Sergei S. Avedisov, Redwood City, CA (US); Ahmadreza Moradipari, Mountain View, CA (US); Hongsheng Lu, San Jose, CA (US); John B. Kenney, Santa Clara, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 139 days.

(21) Appl. No.: 18/494,246

(22) Filed: Oct. 25, 2023

(65) Prior Publication Data

US 2025/0140121 A1 May 1, 2025

(51) Int. Cl.
*G08G 1/00* (2006.01)

(52) U.S. Cl.
CPC ................. *G08G 1/22* (2013.01); *G08G 1/20* (2013.01)

(58) Field of Classification Search
CPC .......... G08G 1/22; G08G 1/20; G08G 1/0112; G08G 1/0133
See application file for complete search history.

(56) References Cited

U.S. PATENT DOCUMENTS

2009/0228172 A1* 9/2009 Markyvech ........... G01S 13/931 701/423
2013/0041567 A1* 2/2013 Yamashiro ................ B60T 7/22 701/96

(Continued)

FOREIGN PATENT DOCUMENTS

CN 113170289 B 2/2022
EP 3210090 B1 10/2020

(Continued)

OTHER PUBLICATIONS

Qin et al. "Moment-based plant and string stability analysis of connected cruise control with stochastic delays." 2015 American Control Conference (ACC). IEEE, 2015.

(Continued)

*Primary Examiner* — Navid Z. Mehdizadeh
*Assistant Examiner* — Caitlin R Mccleary
(74) *Attorney, Agent, or Firm* — Christopher G. Darrow; Darrow Mustafa PC

(57) ABSTRACT

Systems, methods, and other embodiments described herein relate to grouping vehicles by adapting communication parameters for damping disturbances through messaging. In one embodiment, a method includes acquiring sensor data and information from surrounding vehicles. The method also includes identifying traffic conditions for grouping with the vehicles on a road according to the sensor data and the information. The method also includes adapting communication parameters of messages for damping an environmental disturbance that includes factoring the traffic conditions and communicating the messages towards the vehicles until grouping parameters are satisfied, and the damping varies by vehicle positions among the vehicles.

20 Claims, 12 Drawing Sheets

(56) References Cited

U.S. PATENT DOCUMENTS

| | | | | |
|---|---|---|---|---|
| 2014/0045556 | A1 | 2/2014 | Subramanian et al. | |
| 2017/0193822 | A1* | 7/2017 | Song | H04W 4/46 |
| 2017/0227972 | A1 | 8/2017 | Sabau | |
| 2020/0166953 | A1 | 5/2020 | Sabau | |
| 2021/0264793 | A1* | 8/2021 | Shuman | H04W 52/327 |
| 2021/0327280 | A1 | 10/2021 | Choi et al. | |
| 2021/0374802 | A1* | 12/2021 | Longo | G06F 16/2379 |
| 2022/0114895 | A1 | 4/2022 | Avedisov et al. | |
| 2022/0116820 | A1 | 4/2022 | Avedisov et al. | |
| 2022/0369083 | A1* | 11/2022 | Goel | G08G 1/22 |
| 2022/0415175 | A1* | 12/2022 | Vassilovski | G08G 1/096741 |

FOREIGN PATENT DOCUMENTS

| | | | | |
|---|---|---|---|---|
| EP | 3891572 | A1 | 10/2021 | |
| WO | WO-2021253374 | A1 * | 12/2021 | H04W 4/06 |
| WO | 2023065210 | A1 | 4/2023 | |

OTHER PUBLICATIONS

Qin et al. "Stability and frequency response under stochastic communication delays with applications to connected cruise control design." IEEE Transactions on Intelligent Transportation Systems 18.2 (2016): 388-403.

Avedisov et al. "Impacts of connected automated vehicles on freeway traffic patterns at different penetration levels." IEEE Transactions on Intelligent Transportation Systems 23.5 (2020): 4305-4318.

Lin et al. "An Efficient Safety-Oriented Car-Following Model for Connected Automated Vehicles Considering Discrete Signals." IEEE Transactions on Vehicular Technology (2023).

Kalpande et al. "Collision Control of Safety Messages in Wave." International Journal of Computer Applications 975: 8887.

Lim et al. "Efficient Dissemination of Safety Messages in Vehicle Ad Hoc Network Environments." Applied Sciences 13.11 (2023): 6391.

Razzaghpour et al. "Impact of information flow topology on safety of tightly-coupled connected and automated vehicle platoons utilizing stochastic control." 2022 European Control Conference (ECC). IEEE, 2022.

Besselink et al. "String stability and a delay-based spacing policy for vehicle platoons subject to disturbances." IEEE Transactions on Automatic Control 62.9 (2017): 4376-4391.

* cited by examiner

SYSTEMS AND METHODS FOR GROUPING VEHICLES BY ADAPTING MESSAGE COMMUNICATIONS

TECHNICAL FIELD

The subject matter described herein relates, in general, to grouping vehicles using wireless communications, and, more particularly, to grouping vehicles by adapting communication parameters for damping disturbances through messaging.

BACKGROUND

Systems that control traffic encounter difficulties maintaining traffic flow due to environmental changes. For example, a traffic light that controls traffic flow from an on-ramp to a highway can underestimate the space available between vehicles for merging traffic. Furthermore, a road having automated and manually driven vehicles can have a wide-range of traveling velocities that decrease safety and efficiency for traffic flows. Accordingly, vehicles encounter unnecessary congestion and disturbances to traffic flow on roads from systems that control traffic.

Moreover, systems may control traffic flow by vehicles communicating to sustain longitudinal motion through cooperative control. Such systems reduce traffic jams using space management, increase energy efficiency through reduced velocity fluctuations, and improve operator comfort even on roads having vehicles without connectivity capabilities by leveraging the cooperative control. However, these systems face difficulties with rapidly changing and atypical conditions, particularly in denser traffic. Furthermore, system performance can degrade when communication resources for the cooperative control are limited due to interference, bandwidth allocation, or messaging rate. Therefore, systems that group vehicles to reduce congestion and improve traffic flow encounter difficulties from certain traffic conditions and management of wireless resources.

SUMMARY

In one embodiment, example systems and methods that improve grouping vehicles by adapting communication parameters for damping disturbances through messaging are disclosed. In various implementations, systems control traffic by grouping vehicles through cooperative platooning where the vehicles follow a formation (e.g., linear, offset, etc.) for improving traffic flow and energy consumption (e.g., fuel efficiency). In platooning, a following vehicle controls motion (e.g., cooperative adaptive cruise control (CACC)) on a road using information from a vehicle(s) traveling ahead transmitted through a wireless protocol (e.g., vehicle-to-everything (V2X) communications). The control by the following vehicle sustains the formation. However, these systems may encounter challenges in sustaining certain performance levels (e.g., string stability), such as during denser traffic. Furthermore, systems can maintain performance levels by controlling the transmission rate for messages that configure and sustain the grouping through regular communications. Still, systems increasing the transmission rate excessively can overload wireless resources and encounter diminishing performance improvements.

Therefore, in one embodiment, a management system adapts the transmission rate or type of messages communicated for grouping vehicles through factoring traffic conditions (e.g., traffic density, group size, etc.) that improves performance and resource management (e.g., wireless bandwidth). The management system can identify the traffic conditions ahead for the vehicles on a road by acquiring sensor data (e.g., local data, remote data, etc.) and information (e.g., accidents) from surrounding vehicles. In one approach, the system attenuates traffic disturbances (e.g., braking, cutting vehicles, etc.) associated with grouping connected vehicles through damping by gradually increasing the transmission rate of a message describing parameters (e.g., position, speed, etc.) of a vehicle leading the group. However, following vehicles at a certain point in the chain may communicate the message repeatedly without increasing the transmission rate. The management system may continue increasing the transmission rate until satisfying grouping parameters (e.g., velocity changes, braking patterns, etc.) for a performance level. Accordingly, the management system improves string stability, operator comfort, and traffic flow by attenuating a disturbance before amplification and growth when permeating through a group while reducing loads on wireless resources.

Moreover, the management system can switch a message type from having state information (e.g., position, vehicle speed, etc.) to future trajectories about a vehicle for preserving string stability of a group. For example, a following vehicle automatically changes lanes when a leading vehicle indicates that intention within a certain timeframe for avoiding sudden congestion on the current lane from excessive braking of unconnected vehicles. The management system may switch the message type back to state information having a compact data size until satisfying grouping parameters for a performance level. Therefore, the management system improves control of vehicle groupings by a leading vehicle damping a disturbance through intelligent switching of message transmission rates and type, thereby efficiently utilizing wireless resources.

In one embodiment, a management system for grouping vehicles by adapting communication parameters and damping disturbances through messaging is disclosed. The management system has a memory storing instructions that, when executed by a processor, cause the processor to acquire sensor data and information from surrounding vehicles. The instructions also include instructions to identify traffic conditions for grouping with the vehicles on a road according to the sensor data and the information. The instructions also include instructions to adapt communication parameters of messages for damping an environmental disturbance that includes factoring the traffic conditions and communicate the messages towards the vehicles until grouping parameters are satisfied, and the damping varies by vehicle position among the vehicles.

In one embodiment, a non-transitory computer-readable medium for grouping vehicles by adapting communication parameters and damping disturbances through messaging and including instructions that when executed by a processor cause the processor to perform one or more functions is disclosed. The instructions include instructions to acquire sensor data and information from surrounding vehicles. The instructions also include instructions to identify traffic conditions for grouping with the vehicles on a road according to the sensor data and the information. The instructions also include instructions to adapt communication parameters of messages for damping an environmental disturbance that includes factoring the traffic conditions and communicate the messages towards the vehicles until grouping parameters are satisfied, and the damping varies by vehicle position among the vehicles.

In one embodiment, a method for grouping vehicles by adapting communication parameters and damping disturbances through messaging is disclosed. In one embodiment, the method includes acquiring sensor data and information from surrounding vehicles. The method also includes identifying traffic conditions for grouping with the vehicles on a road according to the sensor data and the information. The method also includes adapting communication parameters of messages for damping an environmental disturbance that includes factoring the traffic conditions and communicating the messages towards the vehicles until grouping parameters are satisfied, and the damping varies by vehicle position among the vehicles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with grouping vehicles by adapting communication parameters for damping disturbances through messaging are disclosed herein. In various implementations, systems controlling traffic through cooperative grouping of vehicles (e.g., platooning) encounter disturbances that degrade string stability (e.g., constant following distance). Systems can mitigate certain disturbances (e.g., increased traffic congestion, a cutting vehicle, etc.) by increasing the transmission rate of messages having information that sustains performance for grouping vehicles. In particular, communicating at an increased rate prevents the vehicles from implementing maneuvers using messages having information that ages rapidly from sudden traffic changes, thereby improving performance. Nevertheless, frequent messaging can waste wireless resources that are limited and degrade string stability when vehicles overcompensate for a disturbance.

Therefore, in one embodiment, a management system for grouping vehicles adapts communication parameters (e.g., transmission rate, message type, etc.) of messages for damping environmental disturbances until satisfying grouping parameters, thereby varying damping by vehicle position. Here, the grouping parameters may describe characteristics between the vehicles such as a damping degree, velocity changes, braking patterns, etc. caused by the disturbance ahead of the group. In one approach, a leading vehicle communicates a safety message having speed and position information at an increased transmission rate than a following vehicle repeatedly for mitigating excessive braking ahead of the vehicles until satisfying the grouping parameters. Accordingly, the management system reduces the average age of the safety messages representing the time between message generation and implementation by a controller of the following vehicle near the disturbance source without wasting wireless resources by increasing the transmission rate for all grouped vehicles.

Moreover, in various implementations, the management system has the leading vehicle and the following vehicles communicate an intent message instead of a safety message for mitigating a traffic disturbance. Here, the intent message indicates an upcoming vehicle speed and vehicle position, thereby allowing the following vehicles to infer more about the disturbance than with a safety message. However, the management system may selectively control the transmission rate, following vehicles specifically, etc. communicating intent messages due to message size compared with safety messages. Therefore, the management system controls a vehicle group by intelligently adapting the transmission rate and message type for damping disturbances through messaging while optimizing wireless resources.

Figure 1:
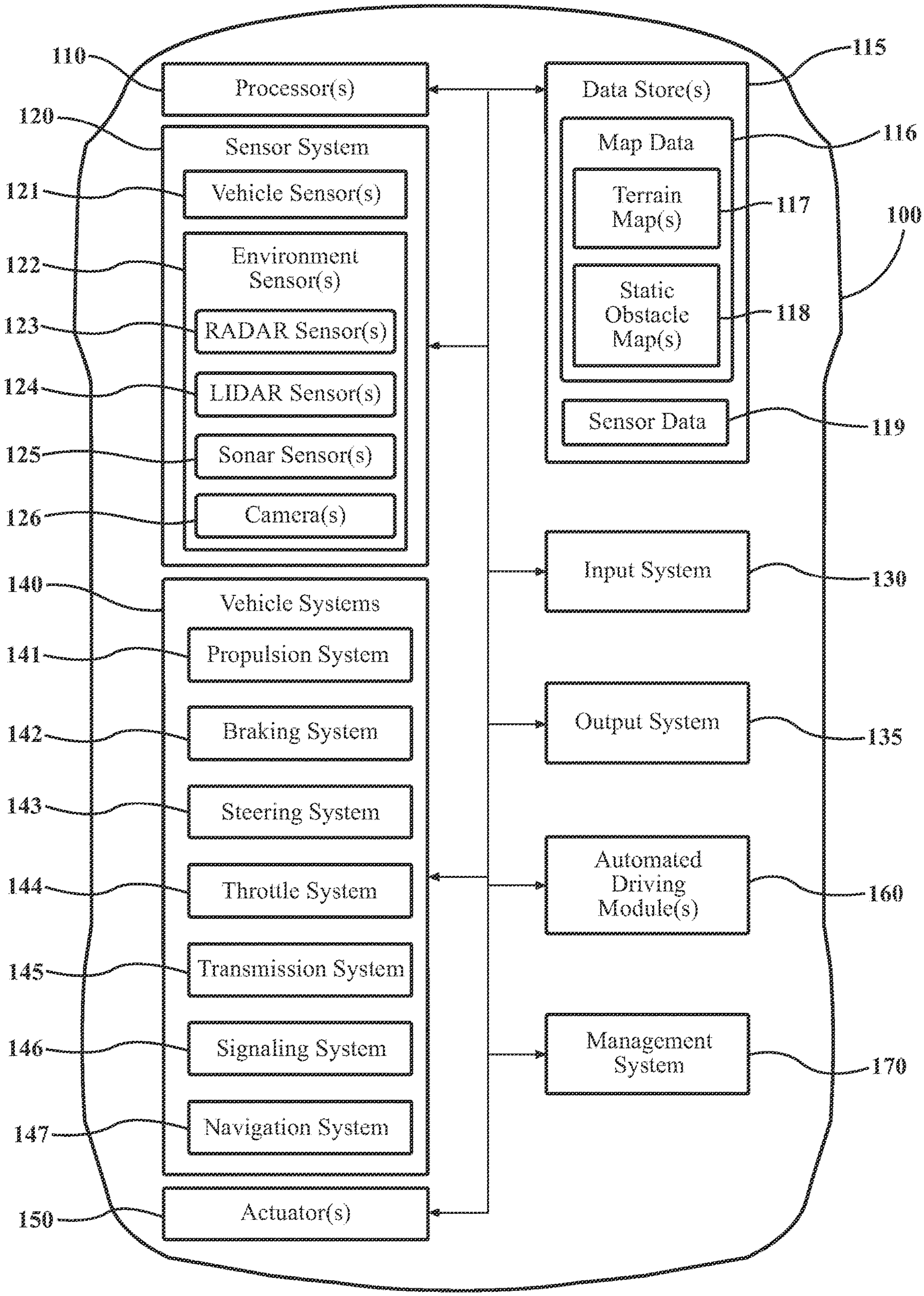
FIG. 1 illustrates one embodiment of a vehicle within which systems and methods disclosed herein may be implemented.

Referring to FIG. 1, an example of a vehicle 100 is illustrated. As used herein, a “vehicle” is any form of motorized transport. In one or more implementations, the vehicle 100 is an automobile. While arrangements will be described herein with respect to automobiles, it will be understood that embodiments are not limited to automobiles. In some implementations, a management system 170 uses road-side units (RSU), consumer electronics (CE), mobile devices, robots, drones, and so on that benefit from the functionality discussed herein associated with grouping vehicles by adapting communication parameters for damping disturbances through messaging.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-12 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a management system 170 that is implemented to perform methods and other functions as disclosed herein relating to improving grouping vehicles by adapting communication parameters for damping disturbances through messaging.

Figure 2:
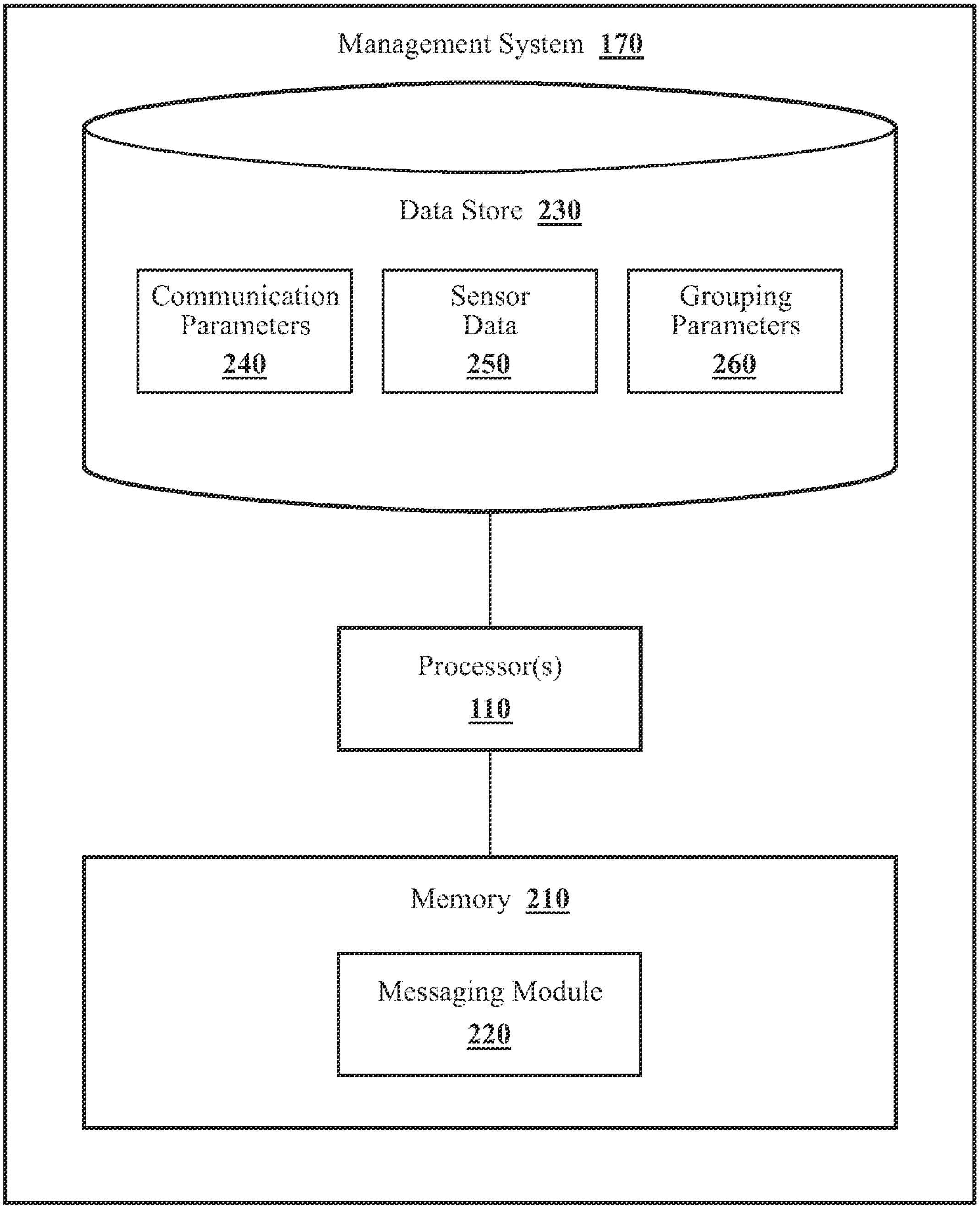
FIG. 2 illustrates one embodiment of a management system that is associated with grouping vehicles by adapting communication parameters for damping disturbances through messaging.

With reference to FIG. 2, one embodiment of the management system 170 of FIG. 1 is further illustrated. The management system 170 is shown as including a processor(s) 110 from the vehicle 100 of FIG. 1. Accordingly, the processor(s) 110 may be a part of the management system 170, the management system 170 may include a separate processor from the processor(s) 110 of the vehicle 100, or the management system 170 may access the processor(s) 110 through a data bus or another communication path. In one embodiment, the management system 170 includes a memory 210 that stores a messaging module 220. The memory 210 is a random-access memory (RAM), a read-only memory (ROM), a hard-disk drive, a flash memory, or other suitable memory for storing the messaging module 220. The messaging module 220 is, for example, computer-readable instructions that when executed by the processor(s) 110 cause the processor(s) 110 to perform the various functions disclosed herein.

The management system 170 as illustrated in FIG. 2 is generally an abstracted form of the management system 170. Furthermore, in one approach, the management system 170 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the management system 170, in one embodiment, acquires sensor data 250 that includes at least camera images. In further arrangements, the management system 170 acquires the sensor data 250 from further sensors such as radar sensors 123, LIDAR sensors 124, and other sensors as may be suitable for identifying and locating vehicles associated with grouping.

Accordingly, the management system 170, in one embodiment, controls the respective sensors to provide the data inputs in the form of the sensor data 250. Additionally, while the management system 170 and the messaging module 220 are discussed as controlling the various sensors to provide the sensor data 250, in one or more embodiments, other techniques can acquire the sensor data 250 that are either active or passive. For example, the management system 170 may passively sniff the sensor data 250 from a stream of electronic information provided by the various sensors to further components within the vehicle 100. Moreover, the management system 170 can undertake various approaches to fuse data from multiple sensors when providing the sensor data 250 and/or from sensor data acquired over a wireless communication link. For instance, a fusion operation combines data by weighing data from other vehicles more than the sensor data 250 acquired locally. Thus, the sensor data 250, in one embodiment, represents a combination of perceptions acquired from multiple sensors.

Moreover, in one embodiment, the management system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the messaging module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes communication parameters 240 for messaging and grouping parameters 260. Here, the communication parameters 240 may include a transmission or repetition rate (e.g., 1 Hertz (Hz)), a transmission frequency (e.g., 1 Giga Hz (GHz)), a safety message type, a maneuver message type, a coordination message type, an intent message type, and a negotiation message type associated with messages for grouping vehicles.

Regarding details about message types for damping a disturbance, a safety message (e.g., a basic safety message (BSM)) is a message communicated wirelessly between a vehicle(s) 100 indicating vehicle position, vehicle speed, static information, dynamic information, etc. such as those defined by the society of automatic engineers (SAE) J2735. The vehicle 100 may complement data for a BSM with a sensor data message (SDM). Here, a SDM may have information about perceived objects by the vehicle 100 such as object class, object position, object speed, object size, etc. that vehicles within a group utilize to sustain string stability and performance. A collective perception message (e.g., SPM) and sensor data sharing message (SDSM) are also types of standardized SDMs that the vehicle 100 may communicate for grouping vehicles by the management system 170.

A maneuver message (MM) may be a message exchanged between the vehicle 100 and infrastructure or another vehicle that includes the future trajectory or possible future trajectories. For example, the vehicle 100 communicates a maneuver coordination message (MCM) or a maneuver sharing coordination message (MSCM) indicating a future trajectory for another vehicle to follow within a group. Furthermore, the intent message may indicate future maneuvers or trajectories by the vehicle 100. For example, the intent message includes breadcrumbs that indicate points where the vehicle 100 will be within the next 1 [s], 2 [s], 3 [s], etc. In one approach, intent messages have bounds on the velocity and acceleration, lane position, and road resources for the vehicle 100. Here, the road resources may be segments of a road that the vehicle 100 will occupy in the future. In this way, vehicles within a group can adapt maneuvers reliably from intent messages.

Other MMs include a negotiation message (NM) where the vehicle 100 requests a cooperative maneuver by a remote vehicle. The vehicle 100 wirelessly communicates a request NM and the remote vehicle may communicate a response NM that either accepts or rejects the request. Additional NMs like reservation NMs or cancellation NMs may be sent by the vehicles for negotiating maneuvers and control within a group. Furthermore, in one approach, intent messages and NMs are referenced as subtypes of MMs for communicating amongst the group. Accordingly, the vehicle 100 communicates various types of messages for managing and coordinating control within the group.

Now turning to the grouping parameters 260, these parameters may include a damping degree, a disturbance maximum for velocity, velocity changes, acceleration changes, a separation distance, grade changes, braking patterns, formation shape (e.g., linear, offset, etc.), etc. between the vehicles within a group. As further explained below, the management system 170 adapts the communication parameters 240 for messaging within vehicles in a group until satisfying one or more of the grouping parameters 260. For example, the management system 170 instructs a vehicle 100 leading a group to communicate a safety message at 10 Hz repeatably while following vehicles from the middle towards the tail (i.e., end) of the group communicate safety messages at 1 Hz. The management system 170 may trigger this action after a vehicle cuts in front of the leading vehicle and causes a disturbance. In the examples given herein, the safety message communicated by the following vehicle may be the same as the leading vehicle, augmented with additional information (e.g., speed, velocity, etc.), different than the leading vehicle, etc. for damping according to the disturbance type or the grouping parameters 260. This configuration continues until a separation distance between vehicles reduces to 5 meters and the management system 170 reduces the transmission rate of the leading vehicle to 1 Hz, thereby conserving wireless resources for other tasks.

Figure 3:
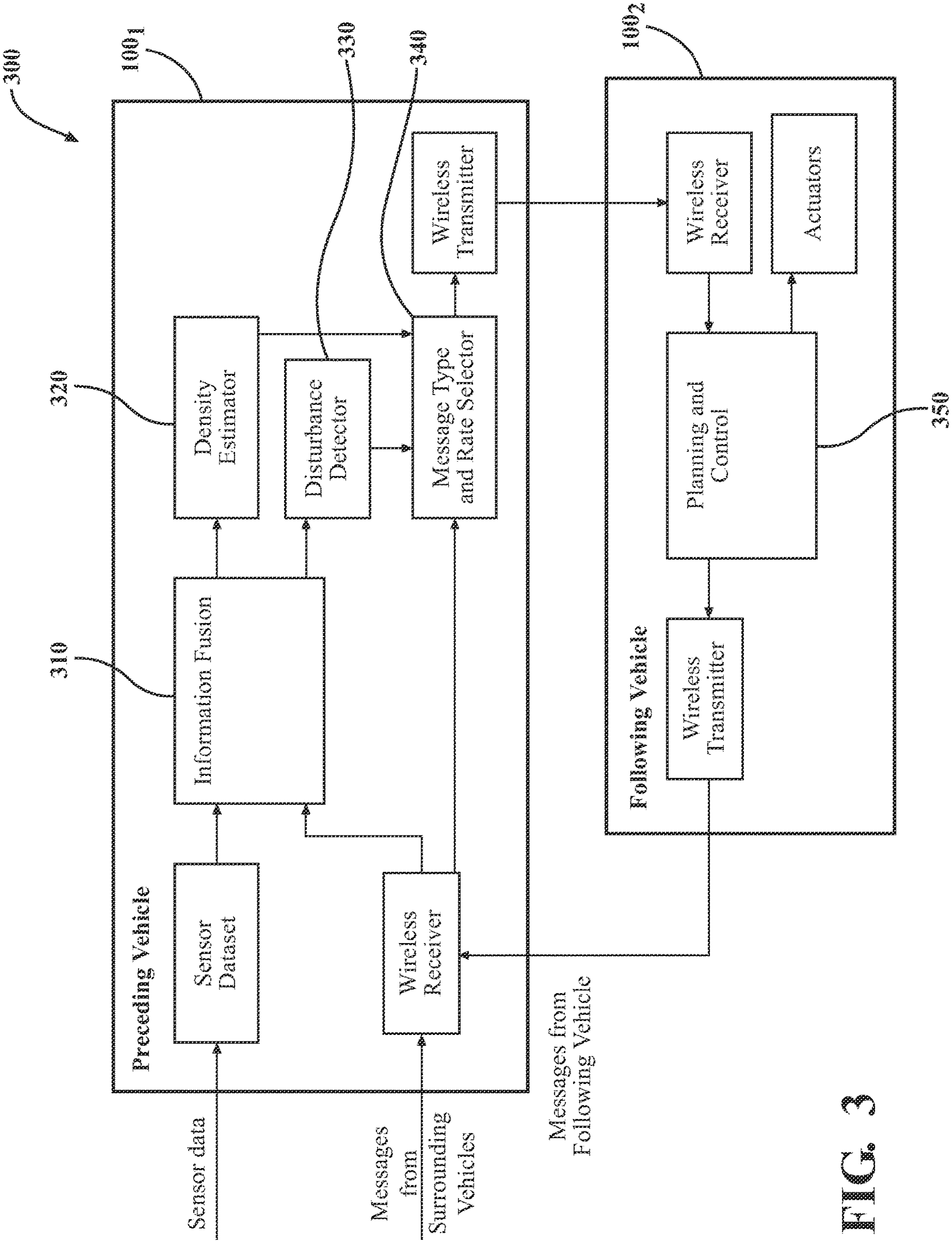
FIG. 3 illustrates one embodiment of a management system implemented by a preceding vehicle and a following vehicle within a vehicle group.

Referring to FIG. 3, one embodiment of the management system 170 implemented by a preceding vehicle and a following vehicle within a vehicle group 300 is illustrated. The vehicle group may be a platoon where vehicles follow a formation for improving traffic flow and fuel efficiency. In platooning, a following vehicle controls longitudinal motion (e.g., cooperative adaptive cruise control (CACC)) on a road using information from a vehicle(s) traveling ahead communicated through a wireless protocol (e.g., vehicle-to-everything (V2X) communication) for sustaining the formation. Here, the preceding vehicle $\mathbf{100}_1$ may be a leading vehicle relative to the following vehicle $\mathbf{100}_2$ in a vehicle group or platoon. Also, certain systems call the preceding vehicle $\mathbf{100}_1$ an ego vehicle, the following vehicle $\mathbf{100}_2$ is called an ado vehicle, and the following vehicles $\mathbf{100}_N$ near the end of the group are called tail vehicles. Furthermore, the following vehicle $\mathbf{100}_2$ can be the preceding vehicle to another vehicle within a chain for grouping vehicles. As such, leading vehicle may be used as a relative term for grouping vehicles within the examples given herein.

In the vehicle group 300, the management system 170, in one embodiment, is further configured to perform additional tasks beyond controlling the respective sensors to acquire and provide the sensor data 250. For example, the management system 170 includes instructions that cause the processor 110 to attenuate traffic disturbances associated with grouping connected vehicles through damping, thereby improving safety and traffic. A disturbance to a leading vehicle can manifest and permeate through braking that causes velocity change $\Delta v$. The disturbance can come from vehicles ahead of the leading vehicle braking, a tunnel, grade changes, a pothole, etc. that increases traffic density. In response, the management system 170 executes a model indicating that increasing a transmission rate of a safety or intent message will preserve string stability, operator comfort, energy consumption, etc. when the group (e.g., a platoon) encounters intervening vehicles caused by dense traffic. As explained in detail below, the management system 170 can mitigate increases to channel load of damping by adapting the transmission rate or message types for a leading vehicle(s) while certain following vehicles communicate at a decreased transmission rate. In the examples, the management system 170 manages vehicle groups by communicating safety and intent messages. However, the management system 170 may utilize any message types that assist vehicles with satisfying the grouping parameters 260 (e.g., separation distance).

In various implementations, the vehicle group 300 adapts both message type and transmission rate according to the disturbance for maintaining string stability. The disturbance context may include a group size, a group location (e.g., an intersection, local road, etc.), a vehicle position, vehicle type (e.g., automated, connected, unconnected, etc.), etc. Regarding vehicle position, for example, the preceding vehicle $\mathbf{100}_1$ starts communicating intent messages at 5 Hz instead of a safety message at 1 Hz while following vehicle $\mathbf{100}_2$ maintains communication parameters because the following vehicle $\mathbf{100}_2$ is distant from the preceding vehicle $\mathbf{100}_1$ and the disturbance. In other words, the transmission rate of messages reduces further down the chain as leading vehicles $\mathbf{100}_1$ become more distant from the disturbance. Furthermore, as explained below, the first vehicle 100 in a group communicates intent messages, middle vehicles communicate safety messages at an increased rate, and the vehicles in the back communicate safety messages at a decreased rate. Here, the safety message communicated by the following vehicle may be the same as the leading vehicle, augmented with additional information (e.g., speed, velocity, etc.), different than the leading vehicle, etc. for damping according to the disturbance type or the grouping parameters 260. In one approach, the management system 170 adapts transmission rates when a leading vehicle $\mathbf{100}_1$ joins a group and recommends vehicle positions according to a group profile, group performance, wireless resources, etc. In this way, the vehicle group 300 adapts robustly to disturbances while maintaining string stability and conserving wireless resources.

Regarding details on managing and conserving wireless resources, a group may use a dedicated short-range communication (DSRC) service, a V2X protocol (e.g., cellular V2X), and so on. A DSRC service allocates resources for a limited number of messages or Bytes per second (e.g., 2000 Bytes/second). The management system 170 can disturb the allocated resources in terms of message content and transmission rate amongst vehicles within a group. For example, a group having vehicles can allocate 1000 Bytes to the first vehicle, 600 Bytes to the second vehicle, and 400 Bytes to a third vehicle. If an intent message is 200 Bytes, the first vehicle can communicate five intent messages per second while the second vehicle can communicate three intent messages per second.

Still referring to FIG. 3, the preceding vehicle $\mathbf{100}_1$ acquires the sensor data 250 (e.g., local data, remote data, etc.) and messages (e.g., safety messages, intent messages, etc.) from surrounding and following vehicles using a wireless receiver. The information fusion 310 organizes and combines the sensor data 250 to simplify computations for the density estimator 320 and the disturbance detector 330 that identifies traffic conditions for grouping vehicles on a road. The message type and rate selector 340 processes the outputs from the density estimator 320 and the disturbance detector 330 to adapt the communication parameters 240 for damping environmental disturbances. Furthermore, a wireless transmitter of the preceding vehicle $\mathbf{100}_1$ communicates the message type and rate selected through a grouping reconfiguration or configuration message to one or more following vehicles $\mathbf{100}_2$. The planning and control 350 automatically alters motion if the following vehicle $\mathbf{100}_2$ is operating in an automated mode or notifies an operator about grouping changes using the message type and rate. The following vehicle $\mathbf{100}_2$ communicates additional messages for further adaptation by the leading vehicle $\mathbf{100}_1$ using a wireless transmitter until satisfying the grouping parameters 260 (e.g., separation distance).

Figure 4A:
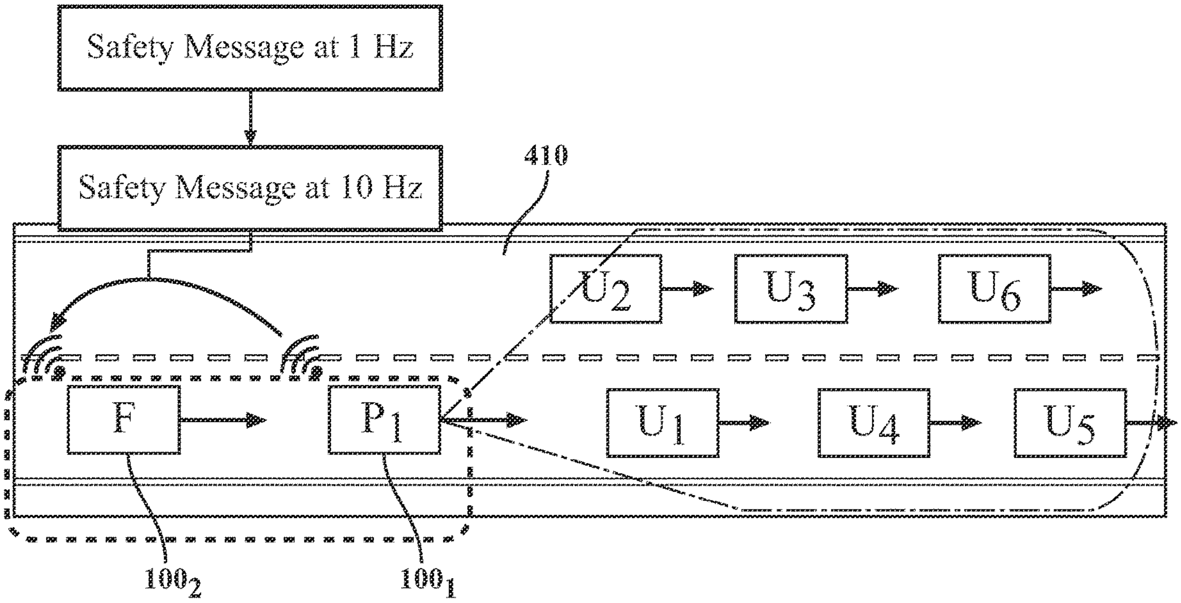
FIG. 4A and FIG. 4B illustrate examples of grouping vehicles by adapting a transmission rate for a safety message or an intent message that damps disturbances.
Figure 4B:
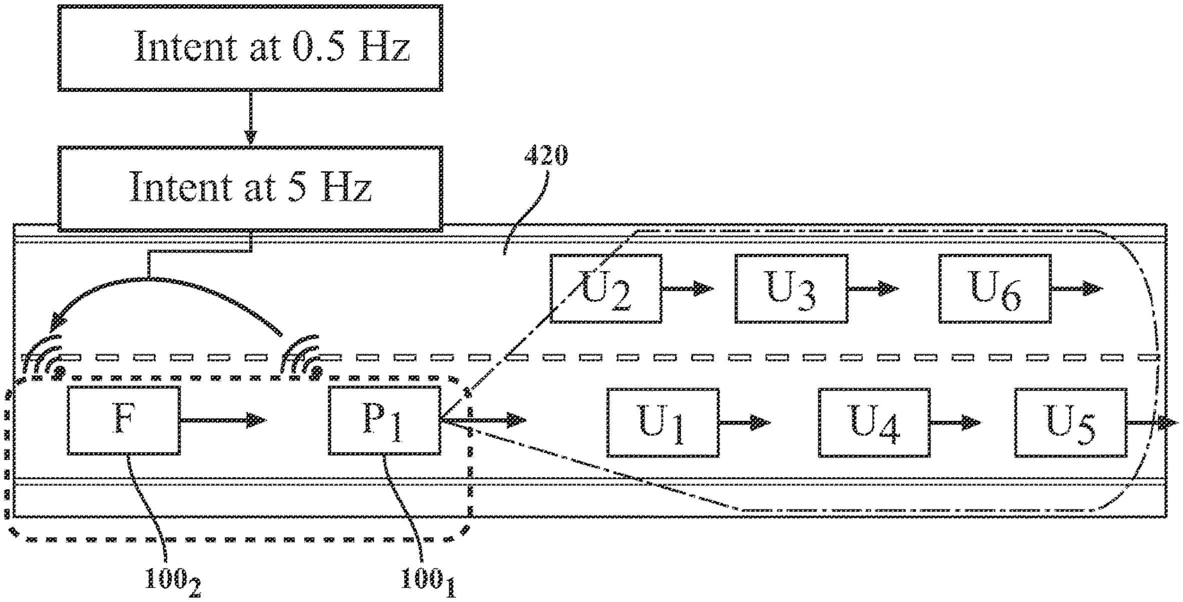

Now turning to FIGS. 4A and 4B, examples of grouping vehicles by adapting a transmission rate for a safety message or an intent message that damps disturbances are illustrated. In FIG. 4A, a preceding vehicle $\mathbf{100}_1$ is traveling on road 410 with a following vehicle $\mathbf{100}_2$. Although the group includes two vehicles, the example illustrated in FIG. 4A may apply to any number of vehicles grouped by the management system 170. The vehicles encounter a gradual or sudden increase in traffic density from sparse conditions as a disturbance. For example, the number of vehicles in a lane suddenly or gradually increases from 5 vehicles per km/lane to 20 vehicles per km/lane. For road 410, unconnected vehicles $U_5$ and $U_6$ join unconnected vehicles $U_1$-$U_4$ that causes an increase in traffic density and risks a formation change between the preceding vehicle $\mathbf{100}_1$ and the following vehicle $\mathbf{100}_2$.

Moreover, the management system 170 and the message type and rate selector 340 process the sensor data 250 and messages from surrounding vehicles using a model. In one approach, the model uses a lookup table, executes vehicle simulations, a car-following model (e.g., an intelligent driver model (IDM), an optimal velocity model (OVM), etc.) for selecting a message type and transmission rate. In this case, the preceding vehicle $\mathbf{100}_1$ communicates a safety message having position and velocity information associated with disturbance and increases the transmission or repetition rate from 1 Hz to 10 Hz. Increasing the transmission rate rapidly damps the disturbance and affects the following vehicle $\mathbf{100}_2$ from having regular updates about the disturbance. Prior to increasing the transmission rate, the preceding vehicle $\mathbf{100}_1$ may communicate the message type and rate selected through a grouping reconfiguration or configuration message to the following vehicle $\mathbf{100}_2$. Communicating at this rate continues until the preceding vehicle $\mathbf{100}_1$ and the following vehicle $\mathbf{100}_2$ satisfy the grouping parameters 260.

In FIG. 4B, the preceding vehicle $\mathbf{100}_1$ and the following vehicle $\mathbf{100}_2$ traveling on the road 420 encounter a sudden increase in traffic density as a traffic disturbance like that illustrated in FIG. 4A. Before the sudden increase, the management system 170 was sustaining the grouping parameters 260 by communicating intent messages about future trajectories at 0.5 Hz. Here, the management system 170 and the message type and rate selector 340 process the sensor data 250 and messages from surrounding vehicles using the model for damping traffic disturbances. The model computes that increasing the transmission or repetition rate to 5 Hz will damp and decay the traffic disturbance to the following vehicle $\mathbf{100}_2$ rapidly without straining wireless resources. Prior to increasing the transmission rate, the preceding vehicle $\mathbf{100}_1$ may communicate the message type and rate selected through a grouping reconfiguration or configuration message to the following vehicle $\mathbf{100}_2$. Communicating at this rate continues until the preceding vehicle $\mathbf{100}_1$ and the following vehicle $\mathbf{100}_2$ satisfy the grouping parameters 260 (e.g., formation shape). Accordingly, the management system 170 preserves string stability, operator comfort, energy consumption, etc. by increasing the transmission rate of a safety message or an intent message.

Figure 5:
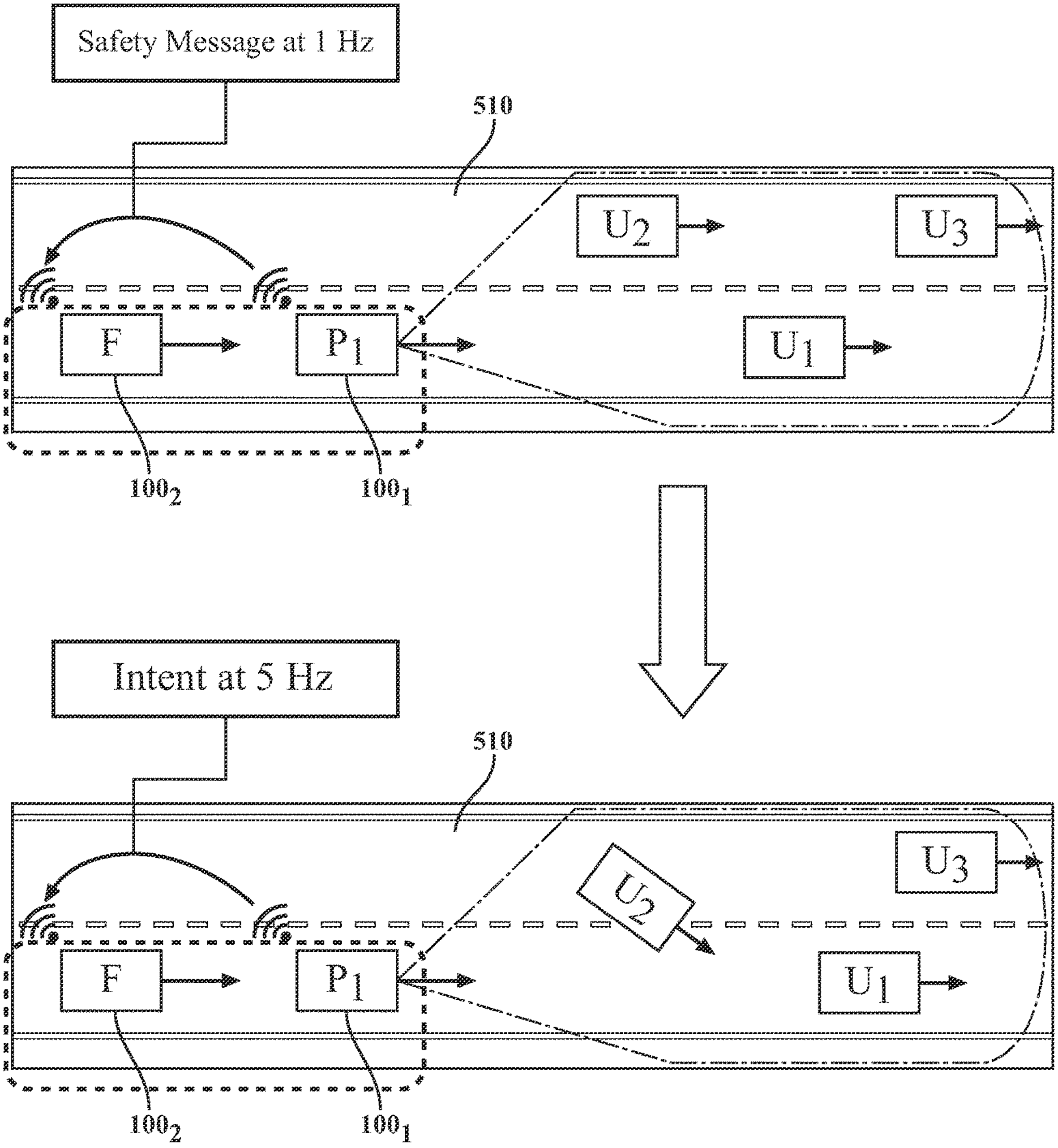
FIG. 5 illustrates an example of grouping vehicles by switching a message type to an intent message having an increased transmission rate for damping disturbances.

Referring to FIG. 5, an example of grouping vehicles by switching a message type to an intent message having an increased transmission rate for damping disturbances is illustrated. Here, road 510 has unconnected vehicles $U_1$-$U_3$ ahead of the preceding vehicle $\mathbf{100}_1$ and the following vehicle $\mathbf{100}_2$. Although the group includes two vehicles, the example illustrated in FIG. 5 may apply to any number of vehicles grouped by the management system 170. Initially, the management system 170 and the message type and rate selector 340 process the sensor data 250 and messages from surrounding vehicles using the model and identify that communicating a safety message at 1 Hz satisfies parameters for string stability, operator comfort, energy consumption, etc. The traffic conditions change when unconnected vehicle $U_2$ suddenly cuts or gradually merges in front of the preceding vehicle $\mathbf{100}_1$ causing a disturbance. Although the example in FIG. 5 is the vehicle $U_2$ changing lanes on the road 510, disturbances may also include a traffic density or flow change for various sources (e.g., debris, weather conditions, etc.). Here, the management system 170 and the message type and rate selector 340 process the sensor data 250 and messages from surrounding vehicles using the model for damping the disturbance. The model computes that switching to an intent message from a safety message and increasing the transmission rate to 5 Hz will damp and decay the traffic disturbance without straining wireless resources.

Moreover, prior to increasing the transmission rate and message type, the preceding vehicle $\mathbf{100}_1$ may communicate the message type and rate selected through a grouping reconfiguration or configuration message to the following vehicle $\mathbf{100}_2$. As such, communicating at this rate with an intent message continues until the preceding vehicle $\mathbf{100}_1$ and the following vehicle $\mathbf{100}_2$ satisfy the grouping parameters 260 (e.g., formation shape). The management system 170 may then switch back to communicating safety messages between the preceding vehicle $\mathbf{100}_1$ and the following vehicle $\mathbf{100}_2$ to conserve wireless resources since intent messages demand more bandwidth.

Figure 6:
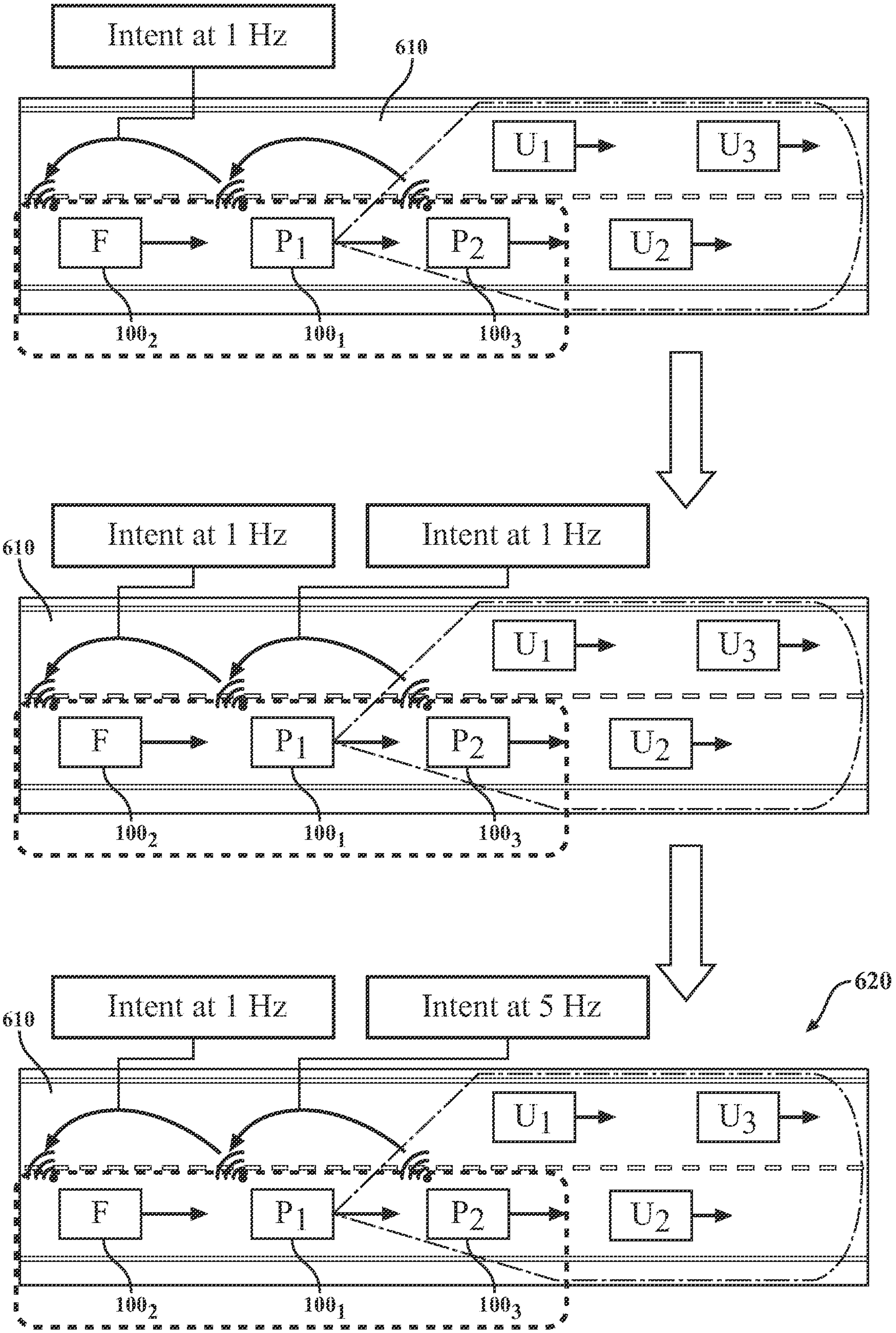
FIG. 6 illustrates an example of grouping vehicles by increasing a transmission rate of an intent message by preceding vehicles without changing other transmission rates for damping disturbances.

Now turning to FIG. 6, examples of grouping vehicles by increasing a transmission rate of an intent message by preceding vehicles without changing other transmission rates for damping disturbances are illustrated. Here, a preceding vehicle $\mathbf{100}_1$ is traveling on road 610 with a following vehicle $100_2$. Although the group includes two vehicles, the example illustrated in FIG. 6 may apply to any number of vehicles grouped by the management system 170. Initially, the preceding vehicle $100_1$ communicates intent messages at 1 Hz that sustain string stability during traffic conditions that are sparse. The traffic conditions change with an increase in traffic density when unconnected vehicle $U_3$ joins unconnected vehicles $U_1$ and $U_2$ and a preceding vehicle $100_3$ attempts to join the group, thereby causing a disturbance. Following the disturbance, the management system 170 and the message type and rate selector 340 process the sensor data 250 and messages from surrounding vehicles using the model for damping the disturbance. In particular, the model computes that the preceding vehicle $100_1$ and the preceding vehicle $100_3$ communicating intent messages at 1 Hz will damp and decay the disturbance. As such, communicating the intent messages at the increased rate continues until the preceding vehicle $100_1$, the preceding vehicle $100_3$, and the following vehicle $100_2$ satisfy the grouping parameters 260 (e.g., formation shape).

In various implementations, the management system 170 through the model computes a need for increasing the transmission rate to satisfy the grouping parameters 260 during a subsequent time period. Here, the preceding vehicle $100_3$ identifies that communicating a speed profile for a time period (e.g., 5 seconds) in the future to the preceding vehicle $100_1$ will mitigate a disturbance. For example, the speed profile indicates that the preceding vehicle $100_3$ will brake to 50 km/h and then accelerate to 70 km/h as computed by a car-following model (e.g., an IDM, an OVM, etc.) As such, the preceding vehicle $100_3$ begins communicating intent messages at 5 Hz while the preceding vehicle $100_1$ continues communicating at 1 Hz in a traffic scenario 620. Prior to increasing the transmission rate, the preceding vehicle $100_3$ may communicate the message type and rate selected through a grouping reconfiguration or configuration message to the preceding vehicle $100_1$. In this way, the disturbance to the following vehicle $100_2$ decays rapidly as the increased transmission rate mitigates the adverse effects of changing traffic conditions more proximate to the source. The preceding vehicle $100_1$ continuing communications at 1 Hz also conserves wireless resources for other tasks. In one approach, the management system 170 flexibly adapts by satisfying different grouping parameters 260 for the preceding vehicle $100_1$ near the front end than the following vehicle $100_2$ near the back end of the group. Accordingly, the management system 170 robustly damps a disturbance caused by changing traffic conditions and vehicles joining the group while intelligently conserving wireless resources.

Figure 7A:
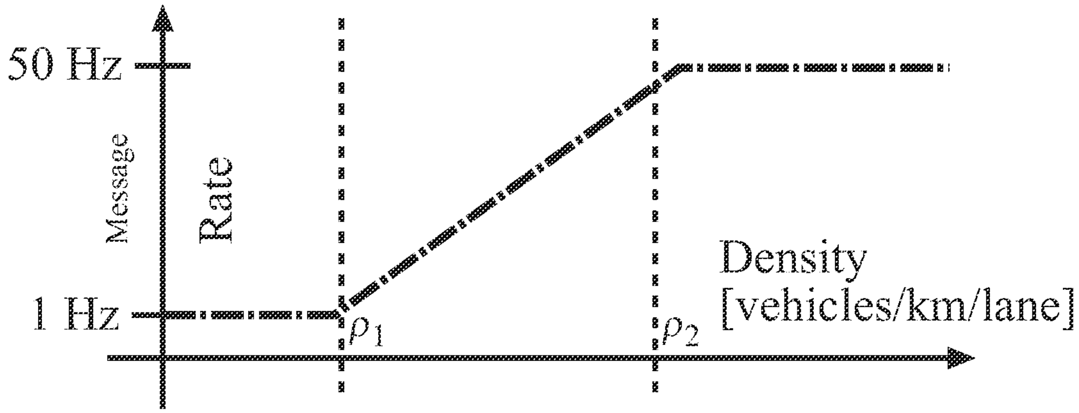
FIG. 7A and FIG. 7B illustrate examples of grouping vehicles by increasing the transmission rate of a safety message according to traffic density or velocity fluctuations for damping disturbances.
Figure 7B:
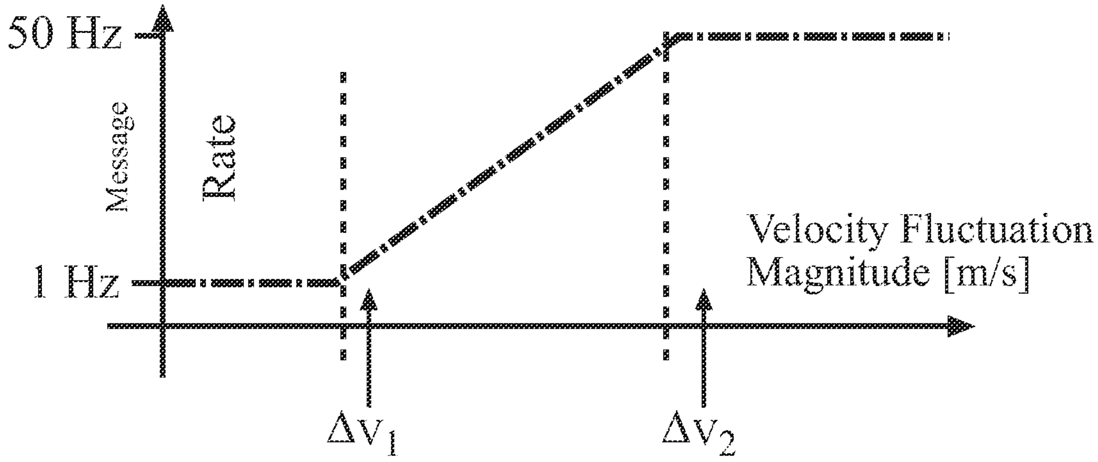

Referring to FIG. 7A and FIG. 7B, examples of grouping vehicles by increasing the transmission rate of a safety message according to traffic density or velocity fluctuations for damping disturbances are illustrated. In FIG. 7A, the management system 170 increases a transmission or repetition rate for a message (e.g., a safety message, an intent message, etc.) from 1 Hz to 50 Hz when traffic density (e.g., vehicles/km/lane) increases from $\rho_1 \rightarrow \rho_2$ for damping the disturbance ahead of a group. Here, the vehicles communicating updates more frequently about position, speed, and future trajectories damp or decay the disturbance caused by the frequency increase. The relationship in FIG. 7A applies for a traffic environment that is mixed with a few connected vehicles. In one approach, when the market penetration of connected vehicles increases beyond a certain threshold, the management system 170 decreases the transmission rate for messages, thereby avoiding the saturation of wireless resources.

In FIG. 7A, the preceding vehicle $100_1$, the following vehicle $100_2$, or the preceding vehicle $100_3$ may communicate at 50 Hz until satisfying one or more of the grouping parameters 260 and subsequently switch to a decreased transmission rate for conserving wireless resources. In FIG. 7B, the management system 170 increases a transmission rate for a message (e.g., a safety message, an intent message, etc.) from 1 Hz to 50 Hz when a velocity fluctuation (e.g., m/s) detected by the group suddenly increases from $\Delta v_1$ to $\Delta v_2$ for the preceding vehicle $100_1$ and the following vehicle $100_2$, respectively. As in previous scenarios, the preceding vehicle $100_1$ and the following vehicle $100_2$ may communicate at 50 Hz until satisfying one or more of the grouping parameters 260 and subsequently switch to a decreased transmission rate for conserving wireless resources.

Figure 8A:
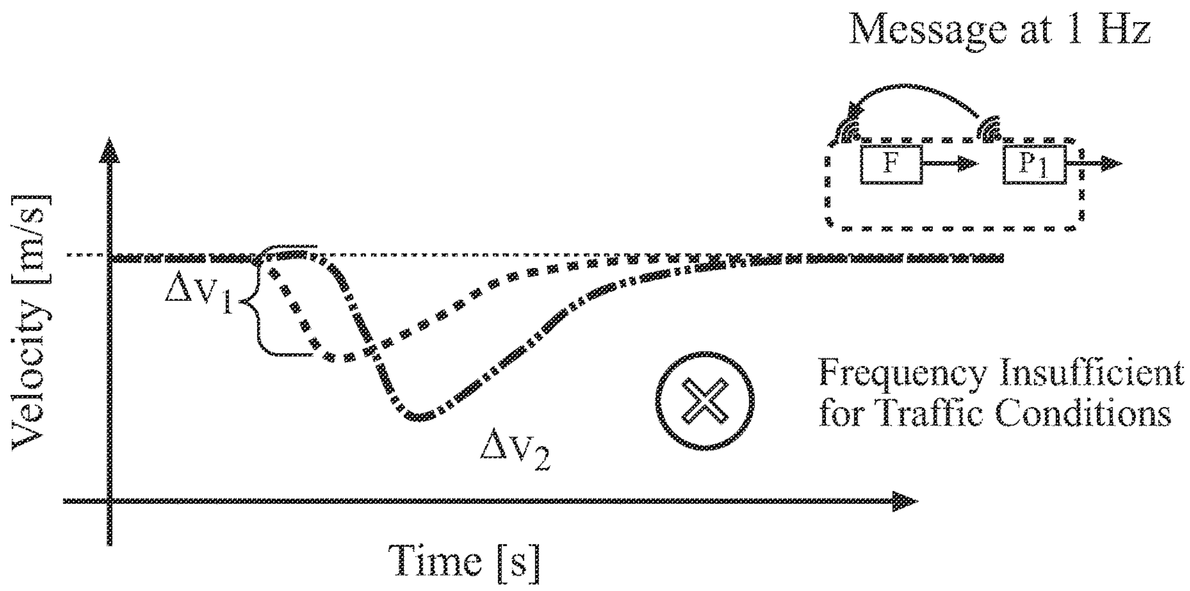
FIG. 8A and FIG. 8B illustrate examples of a traffic disturbance amplifying a velocity change within a vehicle group and damping the velocity change.
Figure 8B:
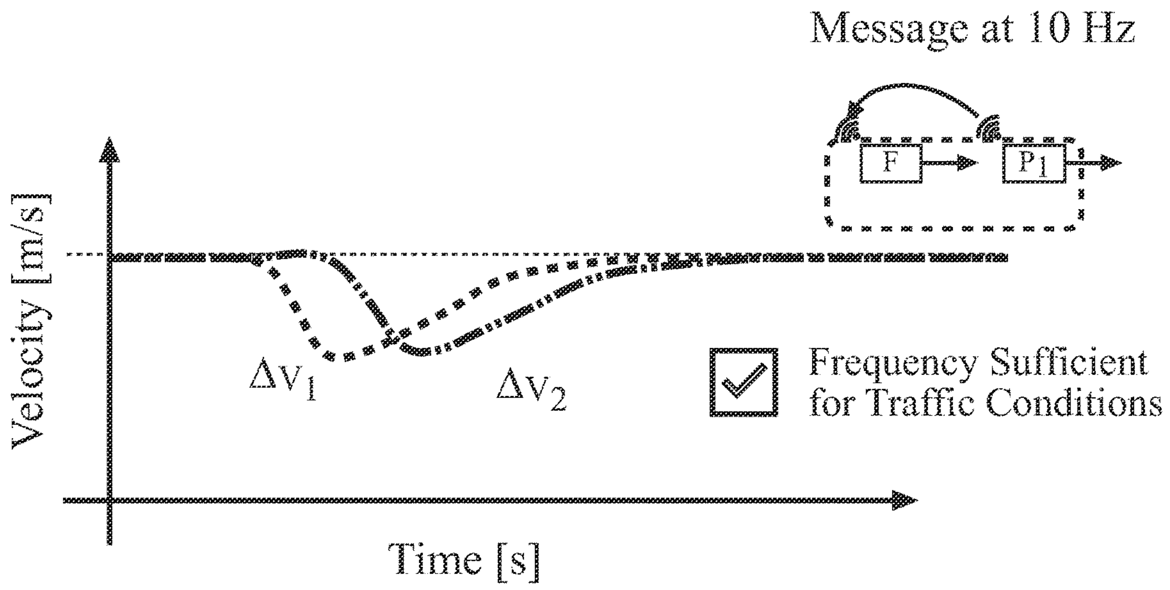

Now turning to FIG. 8A and FIG. 8B, examples of a traffic disturbance amplifying a velocity change within a vehicle group and damping the velocity change are illustrated. Here, the preceding vehicle $100_1$ brakes from a disturbance that causes a velocity fluctuation of $\Delta v_1$. The velocity fluctuation to following vehicle $100_2$ represented by $\Delta v_2$ amplifies and becomes greater than $\Delta v_1$, where the motion fluctuations are different than that in FIG. 7B. As such, the management system 170 and the message type and rate selector 340 process the sensor data 250 and messages from surrounding vehicles using the model for amplification reductions. In FIG. 8B, increasing the transmission rate and/or type for messages (e.g., a safety message, an intent message, etc.) from 1 Hz to 10 Hz reduces velocity fluctuation of $\Delta v_2$ to below $\Delta v_1$ and mitigates amplification of the disturbance, thereby stabilizing group motion.

Figure 9:
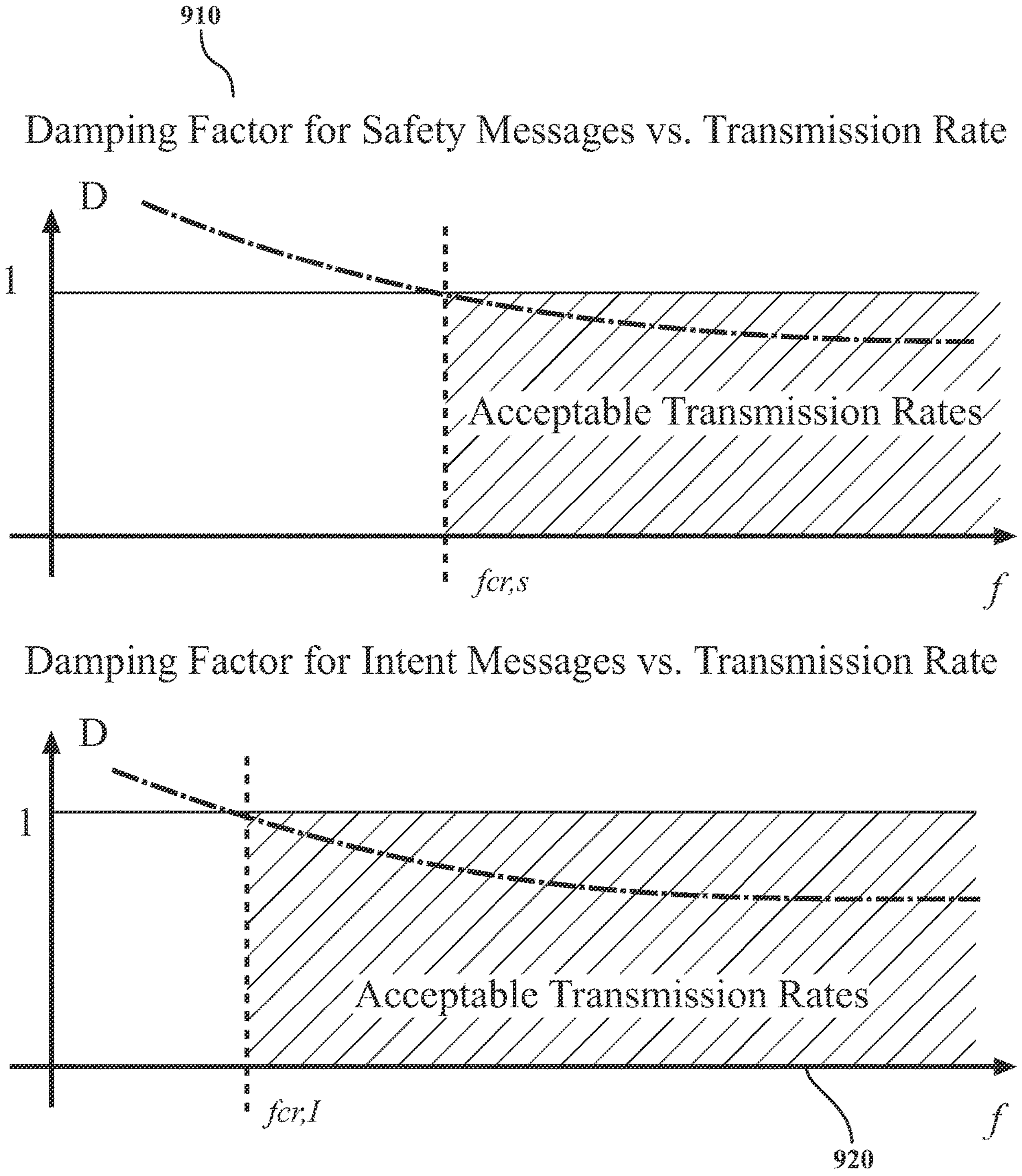
FIG. 9 illustrates an example of a management system identifying a transmission rate for damping and preventing a disturbance from amplifying.

Details on damping disturbances are further illustrated in FIG. 9. Here, an example of the management system 170 identifying a transmission rate for damping and preventing a disturbance amplification is illustrated by FIG. 9. In configuration 910, a disturbance is greater on the following vehicle $100_2$ than a preceding vehicle $100_1$ when the damping factor D is greater than 1. This may occur when the transmission rate for a safety message is below the critical rate $f_{cr,s}$. In other words, a disturbance amplifies when a preceding vehicle communicates a safety message at $0<\text{transmission rate}<f_{cr,s}$. Therefore, the management system 170 selects a transmission rate greater than $f_{cr,s}$. The management system 170 may adapt the transmission rate until satisfying the grouping parameters 260 for the disturbance without overloading wireless resources through excessive transmission rates.

Moreover, the management system 170 in configuration 920 selects a transmission rate greater than the critical rate $f_{cr,I}$ and adapts the transmission rate until satisfying the grouping parameters 260 for the disturbance. Like the configuration 910, the management system 170 adapts the transmission rate without overloading wireless resources through excessive transmission rates. Here, the management system 170 can select a lower transmission rate for an intent message associated with the same disturbance unlike the configuration 910. In particular, intent messages may have additional information that more effectively and rapidly mitigate certain disturbances than safety messages.

Figure 10:
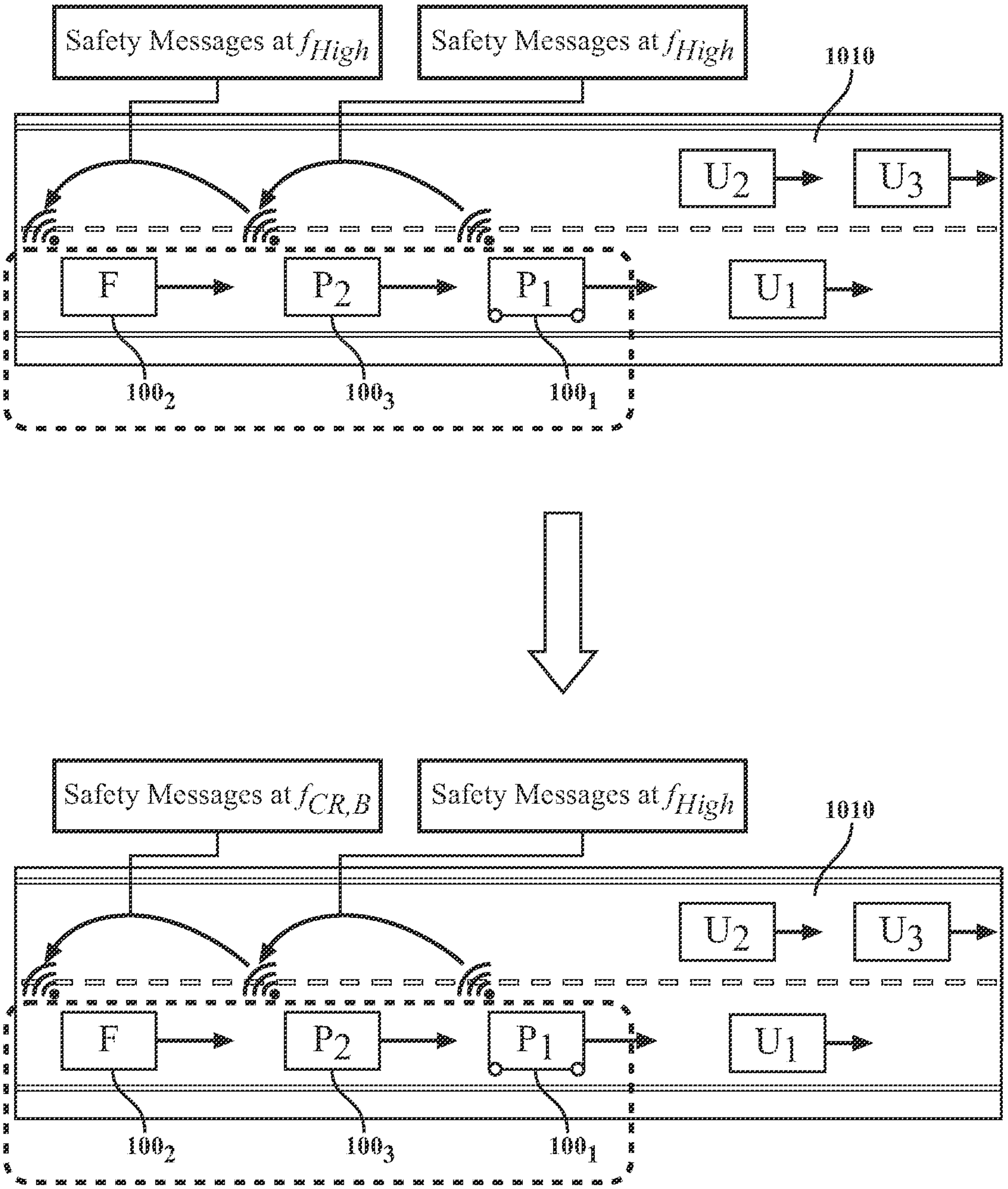
FIG. 10 illustrates an example of damping a disturbance by preceding vehicles that prevents amplification of the disturbance among a vehicle group.

Now turning to FIG. 10, an example of damping a disturbance by preceding vehicles that prevents amplification of the disturbance among a vehicle group. The example in FIG. 10 involves the communication of safety messages. However, the management system 170 can similarly adapt the communication parameters 240 for damping a disturbance through intent messages. Here, a preceding vehicle $100_3$ is traveling on road 1010 with a following vehicle $100_2$.

Although the group includes two vehicles, the example illustrated in FIG. 10 may apply to any number of vehicles grouped by the management system 170. Initially, the preceding vehicle $\mathbf{100}_3$ communicates safety messages at $f_{High}$ that sustains string stability with the following vehicle $\mathbf{100}_2$ during traffic conditions that are sparse. The traffic conditions change with an increase in traffic density when unconnected vehicle $U_3$ joins unconnected vehicles $U_1$ and $U_2$ and a preceding vehicle $\mathbf{100}_1$ attempts to join the group, thereby causing a disturbance. Following the disturbance, the management system 170 and the message type and rate selector 340 process the sensor data 250 and messages from surrounding vehicles using the model for damping the disturbance.

For details on describing the adaptation in FIG. 10, the management system 170 instructs the preceding vehicle $\mathbf{100}_1$ to communicate safety messages (e.g., BSMs) at an increased frequency $f_{High}$. The following vehicle $\mathbf{100}_2$ communicates safety messages at a decreased frequency $f_{cr,B}$. Here, the damping factor is $D_{P_2,F}=D_R$ from $P_2$ to F, where $D_R$ satisfies requirements for the grouping parameters 260. When preceding vehicle $P_1$ joins the group, both vehicles initially communicate safety messages at $f_{High}$, and the total damping factor becomes $$D_{total} = D_{P_1,P_2} \cdot D_{P_2,F} = D_R^2 < D_R. \quad \text{Equation (1)}$$

If the total damping factor is less than the required damping factor, the management system 170 reduces the transmission rate for vehicle $P_2$ of safety messages to the vehicle F so that the $D_{P_2,F}=1$ (or slightly less than 1). As such, the management system 170 reduces the transmission rate of safety messages communicated to vehicle F from vehicle $P_2$ approximately to the critical rate $f_{CR,B}$. As explained previously, prior to decreasing the transmission rate, the preceding vehicle $\mathbf{100}_3$ may communicate the message type and rate selected through a grouping reconfiguration or configuration message to the following vehicle $\mathbf{100}_2$. In this way, the damping from $P_2$ to F becomes $D_{P_2,F}=1$ and the group has the same required damping $D_R$, thereby effectively damping the disturbance while conserving wireless resources.

Figure 11:
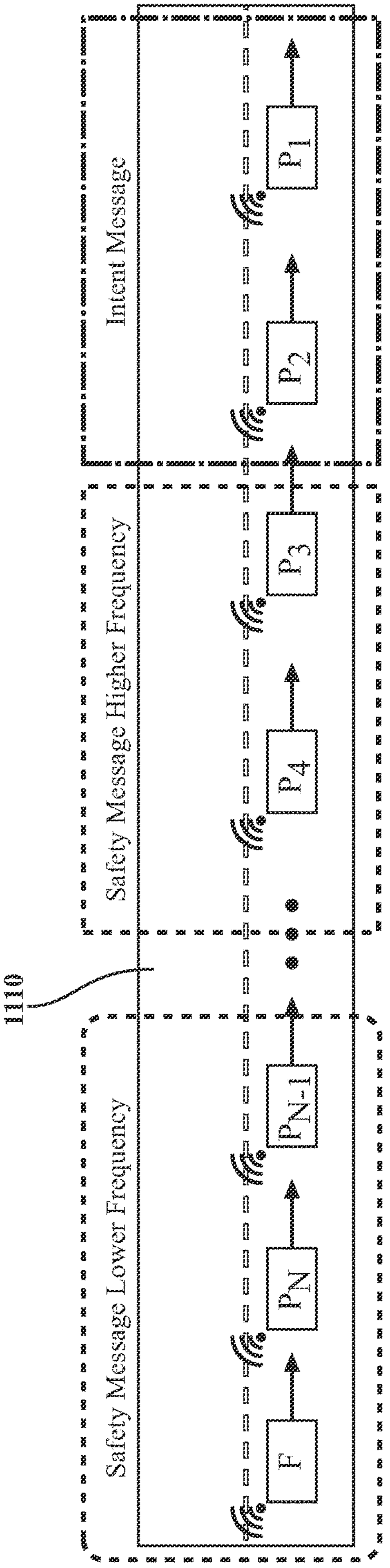
FIG. 11 illustrates an example of the management system selecting various message types and frequencies along a string of grouped vehicles for damping disturbances.

In various implementations, FIG. 11 illustrates an example of the management system 170 selecting various message types and frequencies along a string of grouped vehicles for damping disturbances. Here, preceding vehicles $P_1$, $P_2$, . . . $P_N$ and following vehicle F are traveling as a group on the road 1110. The group may be a platoon where the vehicles follow a formation (e.g., linear, offset, etc.) for improving traffic flow and energy consumption (e.g., fuel efficiency). As previously explained, in platooning a following vehicle controls longitudinal motion (e.g., CACC) on a road using information from a vehicle(s) traveling ahead transmitted through a wireless protocol (e.g., V2X communication) for sustaining the formation. For this group, each leading-following pair may be associated with a damping factor "D" and the management system 170 targets D<1 so that disturbances caused by velocity fluctuations, density changes, etc. decay from preceding to following vehicles. The disturbances by vehicles in this chain may be modeled as follows:

$$F \text{ Disturbance Magnitude: } D_{F,P_N} \cdot D_{P_N,P_{N-1}} \cdot D_{P_2,P_3} \cdot D_{P_2,P_1} \cdot P \quad \text{Equation (2)}$$

$$P_N \text{ Disturbance Magnitude: } D_{P_N,P_{N-1}} \cdot D_{P_2,P_3} \cdot D_{P_2,P_1} \cdot P$$

$$P_3 \text{ Disturbance Magnitude: } D_{P_2,P_3} \cdot D_{P_2,P_1} \cdot P$$

$$P_2 \text{ Disturbance Magnitude: } D_{P_2,P_1} \cdot P$$

$$P_1 \text{ Disturbance Magnitude: } P,$$

where $$D_{F,P_N} \cdot D_{P_N,P_{N-1}} \cdot D_{P_2P_3} \cdot D_{P_2,P_1} \cdot P < D_{P_N,P_{N-1}} \cdot D_{P_2P_3} \cdot D_{P_2,P_1} \cdot P < D_{P_2,P_3} \cdot D_{P_2,P_1} \cdot P < D_{P_2,P_1} \cdot P < P. \quad \text{Equation (3)}$$

In Equations (2) and (3), P is the magnitude of the disturbance observed at vehicle $P_1$ which may be the leading vehicle of the platoon.

As explained in FIG. 9, intent messages may have superior damping properties than safety messages for certain disturbances. However, intent messages may demand additional wireless resources (e.g., additional Bytes) than safety messages. As such, in one approach, vehicles $P_1$ and $P_2$ communicate intent messages at a first transmission rate (e.g., 5 Hz), vehicles $P_3$ and $P_4$ in the middle transmit safety messages at an increased frequency (e.g., 25 Hz), and vehicles $P_{N-1}$, $P_N$, and F communicate safety messages at a decreased frequency (e.g., 1 Hz). Here, the management system 170 may continue adapting the communication parameters 240 for this group until satisfying the grouping parameters 260 and subsequently switch to a decreased transmission rates for vehicles $P_3$ and $P_4$, thereby conserving wireless resources. For example, the grouping parameter 260 may be 1 m/s of velocity changes between vehicles $P_3$ and $P_4$ and 15 meters of separation distance between vehicles $P_{N-1}$, $P_N$, and F at the group tail (i.e., end), thereby attaining traffic flow that is smoother. Furthermore, the management system 170 adapting the transmission rate also decreases or increases an age of the intent messages near a front end among the group that improves the decay rate for the disturbance by mitigating at the source.

Figure 12:
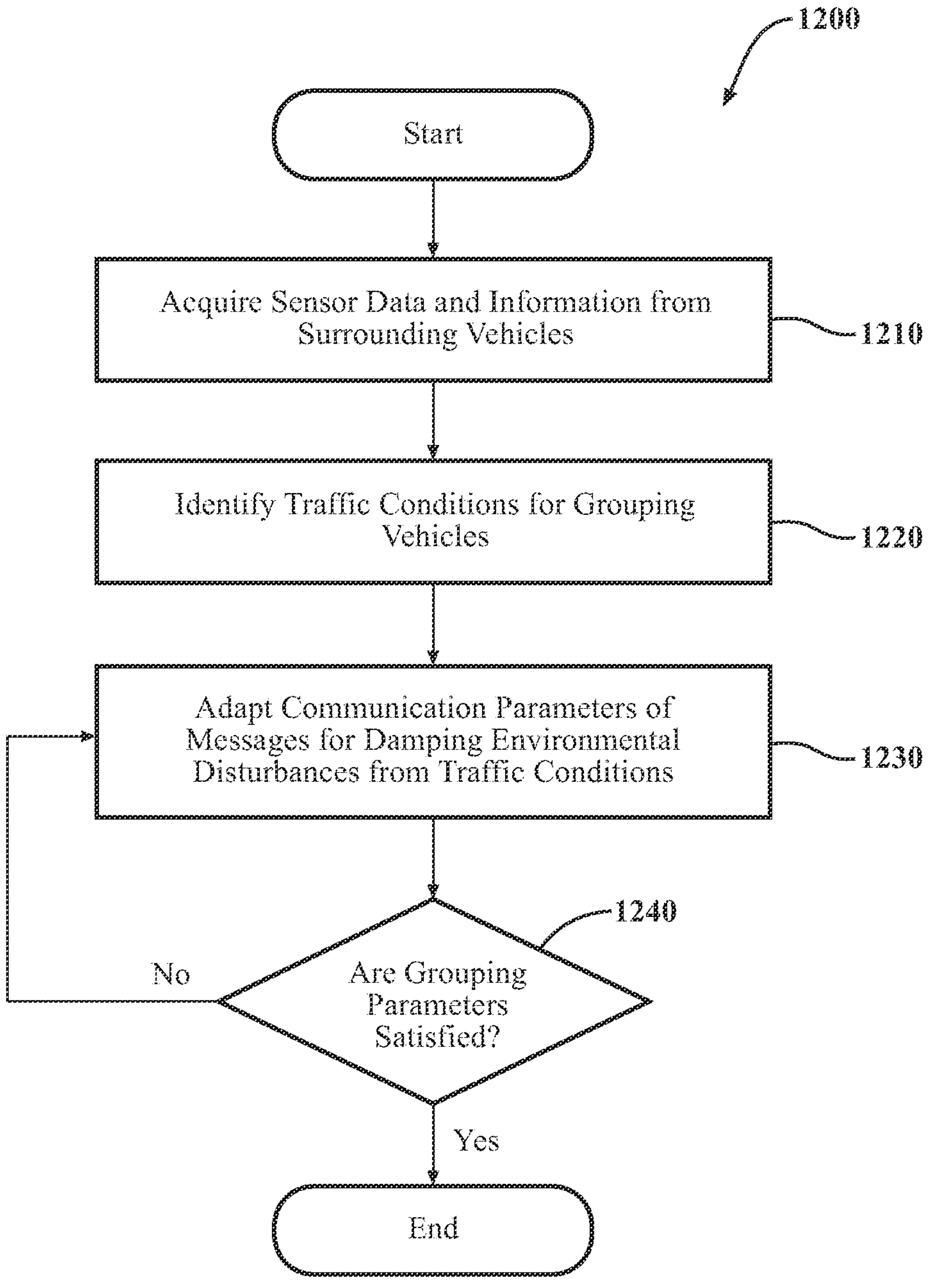
FIG. 12 illustrates one embodiment of a method that is associated with damping disturbances to grouped vehicles by adapting communication parameters for messaging.

Now turning to FIG. 12, a flowchart of a method 1200 that is associated with grouping vehicles by adapting communication parameters for damping disturbances through messaging is illustrated. Method 1200 will be discussed from the perspective of the management system 170 of FIGS. 1 and 2. While method 1200 is discussed in combination with the management system 170, it should be appreciated that the method 1200 is not limited to being implemented within the management system 170 but is instead one example of a system that may implement the method 1200.

At 1210, the management system 170 acquires sensor data (e.g., local data, remote data, etc.) and information from surrounding vehicles using a wireless interface (e.g., a receiver). The sensor data may include information from cameras, radar sensors, LIDAR sensors, and other sensors for identifying and locating vehicles associated with grouping. The information can be messages such as safety messages, intent messages etc. that the management system 170 aggregates for grouping vehicles to operate in a coordinated manner. Furthermore, a preceding vehicle can form datasets from the sensor data and organize the information through fusion operations. For example, the fusion operation combines data by overweighing intent data. Accordingly, the management system 170 acquires reliable and pertinent data for robustly grouping vehicles without wasting wireless resources.

At 1220, the management system 170 identifies traffic conditions for grouping vehicles according to the sensor data and the information. Here, the traffic conditions can include an increase in traffic density from sparse traffic ahead of a preceding vehicle. For example, the number of vehicles in a lane suddenly or gradually increases from 5 vehicles per km/lane to 20 vehicles per km/lane. As explained previously, a pertinent change in traffic conditions also includes an unconnected vehicle merging, an unconnected vehicle cutting-in, etc. ahead of a preceding vehicle. As such, the management system 170 processes these changes in traffic density or patterns ahead of a vehicle group and identifies environmental disturbances accordingly.

At 1230, the management system 170 adapts communication parameters of messages for damping the environmental disturbances from the traffic conditions. Here, the communication parameters may include a transmission rate (e.g., 1 Hz), a transmission frequency (e.g., 1 GHz), a safety message type, a maneuver message type, a coordination message type, an intent message type, and a negotiation message type for the messages. As previously explained, the management system 170 manages vehicle groups by communicating safety and intent messages. However, the management system 170 may utilize any message types that assist vehicles with satisfying grouping parameters (e.g., separation distance). In one approach, the management system 170 adapts the communication parameters by selecting different transmission rates for a message by a preceding vehicle and tail vehicles according to a disturbance. The transmission rate selected may be greater than a critical rate so that the damping factor is less than 1. In this way, the management system 170 prevents the disturbance ahead of the vehicle group from amplifying down the chain to tail vehicles, thereby improving string stability.

Moreover, the messaging module 220 communicates in this configuration until the grouping parameters are satisfied. In another approach, the management system 170 switches a message type to an intent message having an increased transmission rate for damping disturbances. The management system 170 may switch to an intent message for utilizing a lower transmission rate since intent messages have additional information that more effectively and rapidly damps certain disturbances than safety messages, thereby saving wireless resources from avoiding less effective messaging.

At 1240, the management system 170 continues adapting the communication parameters until satisfying the grouping parameters. For example, the adaptation occurs every time interval T where T is greater than the transmission rate (e.g., 10 seconds vs. 1 minute). In one approach, the management system 170 switches the safety message to an intent message transmitted by the preceding vehicle at an increased rate for damping a sudden traffic disturbance. However, the management system 170 maintains the communication of safety messages by the tail vehicles at a decreased rate. In this way, the disturbance to the following vehicles decays rapidly as the increased transmission rate mitigates the adverse effects more proximate to the disturbance source. In this scenario, the preceding vehicles continuing communications at a decreased rate conserve wireless resources for other tasks. In various implementations, the management system 170 flexibly adapts by satisfying different grouping parameters for preceding and following vehicles at the ends (e.g, tail) of a grouping. Accordingly, the management system 170 flexibly and robustly damps disturbances to vehicle groups caused by changing traffic conditions while intelligently conserving wireless resources.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the management system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the management system 170, and/or the automated driving module(s) 160 may control some or all of the vehicle systems 140 and, thus, may be partially or fully autonomous as defined by the SAE levels 0 to 5.

The processor(s) 110, the management system 170, and/or the automated driving module(s) 160 can be operatively connected to communicate with the various vehicle systems 140 and/or individual components thereof. For example, the processor(s) 110, the management system 170, and/or the automated driving module(s) 160 can be in communication to send and/or receive information from the various vehicle systems 140 to control the movement of the vehicle 100. The processor(s) 110, the management system 170, and/or the automated driving module(s) 160 may control some or all of the vehicle systems 140.

The processor(s) 110, the management system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the management system 170, and/or the automated driving module(s) 160 can control the direction and/or speed of the vehicle 100. The processor(s) 110, the management system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the management system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-12, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A management system comprising:

a memory storing instructions that, when executed by a processor, cause the processor to:

acquire sensor data and information from vehicles that are automated using a wireless transceiver by a leading vehicle;

identify traffic conditions by an estimator model of the leading vehicle when grouping the vehicles on a road according to the sensor data and the information; and adapt communication parameters of messages by a communication model for damping an environmental disturbance that includes factoring the traffic conditions and communicate the messages towards the vehicles until grouping parameters are satisfied by the vehicles that alter maneuvers, and a communication rate of the messages associated with the damping varies by the vehicles changing road positions and changing velocities within the grouping.

2. The management system of claim 1, wherein the instructions to adapt the communication parameters of the messages further include instructions to:

select a first transmission rate for a safety message as the messages transmitted by the leading vehicle among the vehicles and communicate the safety message at the first transmission rate until the grouping parameters are satisfied; and configure a second transmission rate for the safety message transmitted by tail vehicles among the vehicles and communicate the safety message at the second transmission rate until the grouping parameters are satisfied, wherein the first transmission rate is higher than the second transmission rate, and the first transmission rate and the second transmission rate being associated with the communication rate.

3. The management system of claim 2, wherein the instructions to adapt the communication parameters of the messages further include instructions to:

switch the safety message to an intent message transmitted by the leading vehicle associated with a sudden traffic disturbance as the environmental disturbance; and maintain selection of the safety message by the tail vehicles for the sudden traffic disturbance ahead of the vehicles.

4. The management system of claim 2, wherein the instructions to adapt the communication parameters of the messages further include instructions to:

switch the safety message to an intent message by the leading vehicle and the tail vehicles among the vehicles associated with a traffic disturbance that is sudden as the environmental disturbance.

5. The management system of claim 2, wherein:

the first transmission rate includes factoring a formation change when a new vehicle joins in between the vehicles that are grouped and the first transmission rate is greater than a critical rate for a damping factor associated with the environmental disturbance; and the environmental disturbance is associated with an ungrouped vehicle lacking vehicle connectivity to communicate with the grouping and the ungrouped vehicle approaches the grouping.

6. The management system of claim 5, wherein the instructions to adapt the communication parameters of the messages further include instructions to:

adjust a transmission rate of the communication parameters to one of decrease and increase an age of the messages near a front end among the vehicles, wherein the age is a time between communication and implementation of the messages by the vehicles.

7. The management system of claim 1, wherein the grouping parameters are one of a damping degree, a disturbance maximum for velocity, acceleration changes, a separation distance, grade changes, and braking patterns between the vehicles.

8. The management system of claim 7, wherein the grouping parameters for a first vehicle at a tail of the vehicles are different than a second vehicle away from the tail.

9. The management system of claim 1, wherein the communication parameters are one of a transmission frequency, a safety message type, a maneuver message type, a coordination message type, an intent message type that indicates an upcoming vehicle speed and the vehicle position, and a negotiation message type for the messages.

10. A non-transitory computer-readable medium comprising: instructions that when executed by a processor cause the processor to:

acquire sensor data and information from vehicles that are automated using a wireless transceiver by a leading vehicle;

identify traffic conditions by an estimator model of the leading vehicle when grouping with the vehicles on a road according to the sensor data and the information; and adapt communication parameters of messages by a communication model for damping an environmental disturbance that includes factoring the traffic conditions and communicate the messages towards the vehicles until grouping parameters are satisfied by the vehicles that alter maneuvers, and a communication rate of the messages associated with the damping varies by the vehicles changing road positions and changing velocities within the grouping.

11. A method comprising:

acquiring sensor data and information from vehicles that are automated using a wireless transceiver by a leading vehicle;

identifying traffic conditions by an estimator model of the leading vehicle when grouping with the vehicles on a road according to the sensor data and the information; and adapting communication parameters of messages by a communication model for damping an environmental disturbance that includes factoring the traffic conditions and communicating the messages towards the vehicles until grouping parameters are satisfied by the vehicles that alter maneuvers, and a communication rate of the messages associated with the damping varies by the vehicles changing road positions and changing velocities within the grouping.

12. The method of claim 11, wherein adapting the communication parameters of the messages further includes:

selecting a first transmission rate for a safety message as the messages transmitted by the leading vehicle among the vehicles and communicating the safety message at the first transmission rate until the grouping parameters are satisfied; and configuring a second transmission rate for the safety message transmitted by tail vehicles among the vehicles and communicating the safety message at the second transmission rate until the grouping parameters are satisfied, wherein the first transmission rate is higher than the second transmission rate, and the first transmission rate and the second transmission rate being associated with the communication rate.

13. The method of claim 12, wherein adapting the communication parameters of the messages further includes:

switching the safety message to an intent message transmitted by the leading vehicle associated with a sudden traffic disturbance as the environmental disturbance; and maintaining selection of the safety message by the tail vehicles for the sudden traffic disturbance ahead of the vehicles.

14. The method of claim 12, wherein adapting the communication parameters of the messages further includes:

switching the safety message to an intent message by the leading vehicle and the tail vehicles among the vehicles associated with a traffic disturbance that is sudden as the environmental disturbance.

15. The method of claim 12, wherein the first transmission rate includes factoring a formation change when a new vehicle joins in between the vehicles that are grouped and the first transmission rate is greater than a critical rate for a damping factor associated with the environmental disturbance; and the environmental disturbance is associated with an ungrouped vehicle lacking vehicle connectivity to communicate with the grouping and the ungrouped vehicle approaches the grouping.

16. The method of claim 15, wherein adapting the communication parameters of the messages further includes:

adjusting a transmission rate of the communication parameters for one of decreasing or increasing an age of the messages near a front end among the vehicles, wherein the age is a time between communication and implementation of the messages by the vehicles.

17. The method of claim 11, wherein the grouping parameters are one of a damping degree, a disturbance maximum for velocity, acceleration changes, a separation distance, grade changes, and braking patterns between the vehicles.

18. The method of claim 17, wherein the grouping parameters for a first vehicle at a tail of the vehicles are different than a second vehicle away from the tail.

19. The method of claim 11, wherein the communication parameters are one of a transmission frequency, a safety message type, a maneuver message type, a coordination message type, an intent message type indicating an upcoming vehicle speed and the vehicle position, and a negotiation message type for the messages.

20. The method of claim 11, wherein the traffic conditions are one of traffic density, size of the vehicles, a cut-in disturbance, and locations of the vehicles.

* * * * *